US011392204B2

(12) United States Patent
Zazzera et al.

(10) Patent No.: US 11,392,204 B2
(45) Date of Patent: Jul. 19, 2022

(54) HAPTICS ADAPTIVE DUTY CYCLE (71) Applicant: QUALCOMM Incorporated, San Diego, CA (US)

(72) Inventors: Joshua Zazzera, Phoenix, AZ (US); Joseph Dale Rutkowski, Chandler, AZ (US); Milind Sawant, San Jose, CA (US); Shivaprakash Halagur, Singapore (SG)

(73) Assignee: QUALCOMM Incorporated, San Diego, CA (US)

( * ) Notice: Subject to any disclaimer, the term of this patent is extended or adjusted under 35 U.S.C. 154(b) by 74 days.

(21) Appl. No.: 17/031,771

(22) Filed: Sep. 24, 2020

(65) Prior Publication Data
US 2022/0091675 A1    Mar. 24, 2022

(51) Int. Cl.
*H04B 3/38* (2006.01)
*G06F 3/01* (2006.01)
*B06B 1/10* (2006.01)

(52) U.S. Cl.
CPC ............... *G06F 3/016* (2013.01); *B06B 1/10* (2013.01); *B06B 2201/70* (2013.01)

(58) Field of Classification Search
CPC ........ G06F 3/016; B06B 1/10; B06B 2201/70
See application file for complete search history.

(56) References Cited

U.S. PATENT DOCUMENTS

| 2012/0229264 A1* | 9/2012 | Company Bosch .. B06B 1/0253 340/407.1 |
| 2013/0264973 A1 | 10/2013 | Garg et al. |
| 2014/0217945 A1* | 8/2014 | Cahill ................... H02P 25/028 73/660 |
| 2015/0069939 A1 | 3/2015 | Khan et al. |
| 2015/0137713 A1 | 5/2015 | Barsilai et al. |
| 2015/0280621 A1* | 10/2015 | Garg ....................... G06F 3/016 345/173 |

FOREIGN PATENT DOCUMENTS

CN        111294018 A       6/2020

OTHER PUBLICATIONS

International Search Report and Written Opinion—PCT/US2021/044559—ISA/EPO—dated Nov. 16, 2021.

* cited by examiner

*Primary Examiner* — Toan N Pham
(74) *Attorney, Agent, or Firm* — Qualcomm Incorporated (57) ABSTRACT Disclosed are various techniques operating a linear resonant actuator (LRA). In some aspects, a method for operating an LRA includes generating an LRA control signal having a period, the period having an active portion and a high-Z portion according to a duty cycle; detecting, during the high-Z portion of the period, a back electromotive force (BEMF) threshold voltage crossing time and zero voltage crossing time; calculating a period; calculating a BEMF measurement window; calculating a target duty cycle based on the period, the BEMF measurement window, and a margin time; and adjusting the duty cycle of the LRA control signal towards the target duty cycle.

32 Claims, 7 Drawing Sheets

HAPTICS ADAPTIVE DUTY CYCLE

BACKGROUND OF THE DISCLOSURE

1. Field of the Disclosure

Aspects of the disclosure relate generally haptics and more specifically to control of linear resonant actuators.

2. Description of the Related Art

Haptics refers to the use of technology that stimulates the senses of touch and motion, e.g., the study or use of tactile sensations and the sense of touch as a method of interacting with computers and electronic devices. For example, some game controllers used an eccentric rotating mass (ERM) vibration motor to produce a vibration or rumble, e.g., to indicate that the player had driven off of the road in a virtual racing game, to indicate that the player had been hit in a first person shooter game, etc. For smart phones and handheld devices, however, a reduction in device size is desired, and ERMs are relatively large. ERMs have the additional disadvantage that it takes some time for the rotating mass to spin up and spin down, which makes it difficult to use an ERM to provide the "crisp" haptic feedback (having a short start and stop time for the vibration) needed to provide, for example, the sensory illusion that a physical button was pushed on a device having no physical buttons. Thus, mobile devices and other consumer electronics devices have generally moved away from using ERMs to using linear resonant actuators (LRAs) for haptic feedback.

An LRA is an electromechanical device that vibrates to provide tactile feedback. An LRA is like a cone speaker, but without the cone: a coil drives a spring-mounted magnetic mass back and forth to produce a vibrations. Like a speaker, the input to the LRA is a sine wave, which "drives" the mass into vibration. The vibration amplitude (displacement of the mass) can be affected by the peak-to-peak input voltage of the sine wave. Unlike an ERM, where input voltage controls the vibration frequency, an LRA has an inherent resonant frequency, and when LRA is driven with a frequency other than its resonant frequency, the performance and efficiency is dramatically reduced.

One disadvantage of LRAs is that an LRA mass-spring system does not have mechanical dampers, so in order to stop the vibration of the mass quickly, "braking" is used. Typically, braking applies the same sine wave input as driving, but with the opposite polarity. Another disadvantage of LRAs is that the resonant frequency can vary with age of the device, e.g., as the spring loses its elasticity, as well as the temperature of the device, e.g., due to thermal expansion and contraction of the metal parts. Thus, it is necessary to continually evaluate the resonant frequency of an LRA. One technique to evaluate the resonant frequency of an LRA is to measure the back electromotive force (EMF).

Back EMF (BEMF) is an EMF that is induced by a coil turning inside a magnetic field, which, for ERM devices, acts against the applied voltage that is causing the motor to spin, reducing the current flowing through the coils of the motor. For LRA devices, BEMF looks like an alternating current (AC) signal. One way to measure BEMF in LRAs is to set the input drive signal to a high-impedance (high-Z) mode and to measure the BEMF voltage across the input pins. More specifically, in order to sense the resonant frequency of an LRA, the driver is forced into a high impedance mode and the BEMF voltage is monitored to detect when the BEMF changes polarity. Thus, a conventional drive signal for LRAs is a sine wave that includes an active portion that drives or brakes the LRA and a high-Z portion during which BEMF can be measured.

Figure 1:
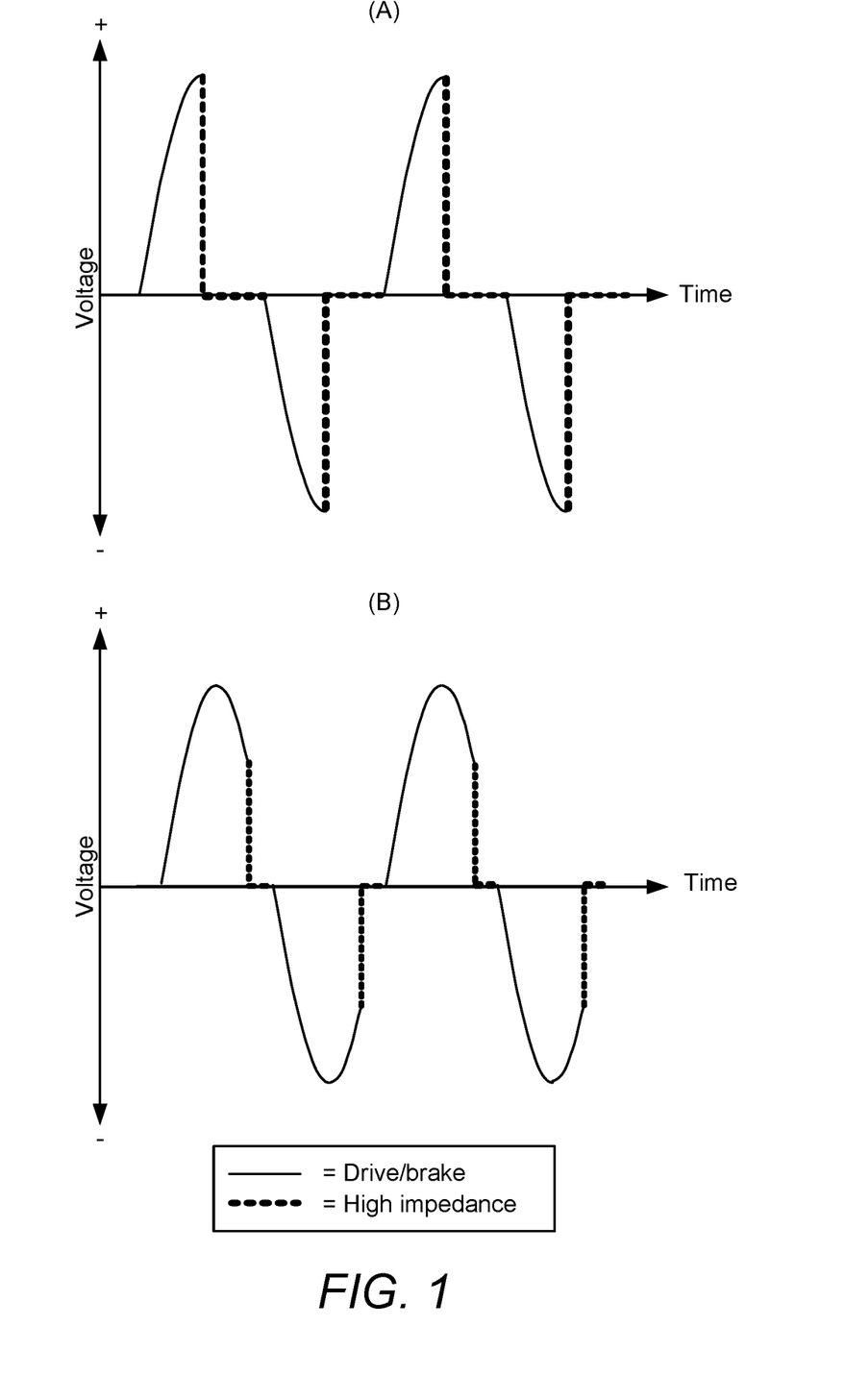
FIG. 1 illustrates conventional drive signals for an linear resonant actuator (LRA).

FIG. 1 illustrates conventional drive signals for an LRA. FIG. 1(a) shows a quarter wave drive (QWD), in which drives the LRA for half of each half cycle, which delivers only about half the possible power to the load. The conventional approach shown in FIG. 1(a) has disadvantages, including the fact that the more time that the control signal is in high-Z mode, the less driving or braking power can be applied to the LRA. This limits the rate at which the LRA can reach full vibration, and also limits the maximum force of full vibration. FIG. 1(b) shows an improvement on the QWD method, i.e., a three-quarter drive waveform in which only $\frac{1}{8}^{th}$ of each half cycle was in high-Z mode. While this increased the power available to the LRA compared to the QWD method, this still limited the power that could be delivered to the LRA, and increased susceptibility of the LRA to auto-resonance issues. If the time during which the control signal is in high-Z mode is too short, there is a risk that, if the LRA resonant frequency suddenly changes, the BEMF change in polarity will not be observed during the too-short high-Z mode window, which would result in incorrect resonant frequency information and degraded drive or brake performance.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In accordance with the various aspects disclosed herein, at least one aspect includes a method of dynamically adapting a drive duty cycle of a linear resonant actuator (LRA) control signal. The method includes generating an LRA control signal having a period, the period having an active portion and a high-z portion according to a duty cycle. The method also includes detecting, during the high-z portion of the period, a back electromotive force (BEMF) threshold voltage crossing time and a BEMF zero voltage crossing time. The method also includes calculating a period. The method also includes calculating a BEMF measurement window. The method also includes calculating a target duty cycle. The method also includes adjusting the duty cycle of the LRA control signal towards the target duty cycle.

In accordance with the various aspects disclosed herein, at least one aspect includes an apparatus for dynamically adapting a drive duty cycle of a linear resonant actuator (LRA) control signal. The apparatus includes a memory and at least one processor communicatively coupled to the memory. The at least one processor is configured to: generate an LRA control signal having a period, the period having an active portion and a high-z portion according to a duty cycle; detect, during the high-z portion of the period, a BEMF threshold voltage crossing time and a BEMF zero voltage crossing time; calculate a period; calculate a BEMF measurement window; calculate a target duty cycle; and adjust the duty cycle of the LRA control signal towards the target duty cycle.

In accordance with the various aspects disclosed herein, at least one aspect includes an apparatus for dynamically adapting a drive duty cycle of a linear resonant actuator (LRA) control signal. The apparatus includes means for generating an LRA control signal having a period, the period having an active portion and a high-z portion according to a duty cycle. The apparatus also includes means for detecting, during the high-z portion of the period, a BEMF threshold voltage crossing time and zero voltage crossing time. The apparatus also includes means for calculating a period. The apparatus also includes means for calculating a BEMF measurement window. The apparatus also includes means for calculating a target duty cycle. The apparatus also includes means for adjusting the duty cycle of the LRA control signal towards the target duty cycle.

In accordance with the various aspects disclosed herein, at least one aspect includes a non-transitory computer-readable medium storing computer-executable instructions. The non-transitory computer-readable medium storing computer-executable instructions includes at least one instruction instructing an apparatus to generate an LRA control signal having a period, the period having an active portion and a high-z portion according to a duty cycle, at least one instruction instructing the apparatus to detect, during the high-z portion of the period, a BEMF threshold voltage crossing time and zero voltage crossing time. The non-transitory computer-readable medium storing computer-executable instructions also includes at least one instruction instructing the apparatus to calculate a period, at least one instruction instructing the apparatus to calculate a BEMF measurement window, at least one instruction instructing the apparatus to calculate a target duty cycle; and at least one instruction instructing the apparatus to adjust the duty cycle towards the target duty cycle.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of examples of one or more aspects of the disclosed subject matter and are provided solely for illustration of the examples and not limitation thereof.

DETAILED DESCRIPTION

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and "example" are used herein to mean "serving as an example, instance, or illustration." Any aspect described herein as "exemplary" or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

To overcome the technical disadvantages of conventional methods for driving and braking linear resonant actuators (LRAs), methods and systems for dynamically adapting the drive duty cycle of an LRA are herein presented.

Figure 2:
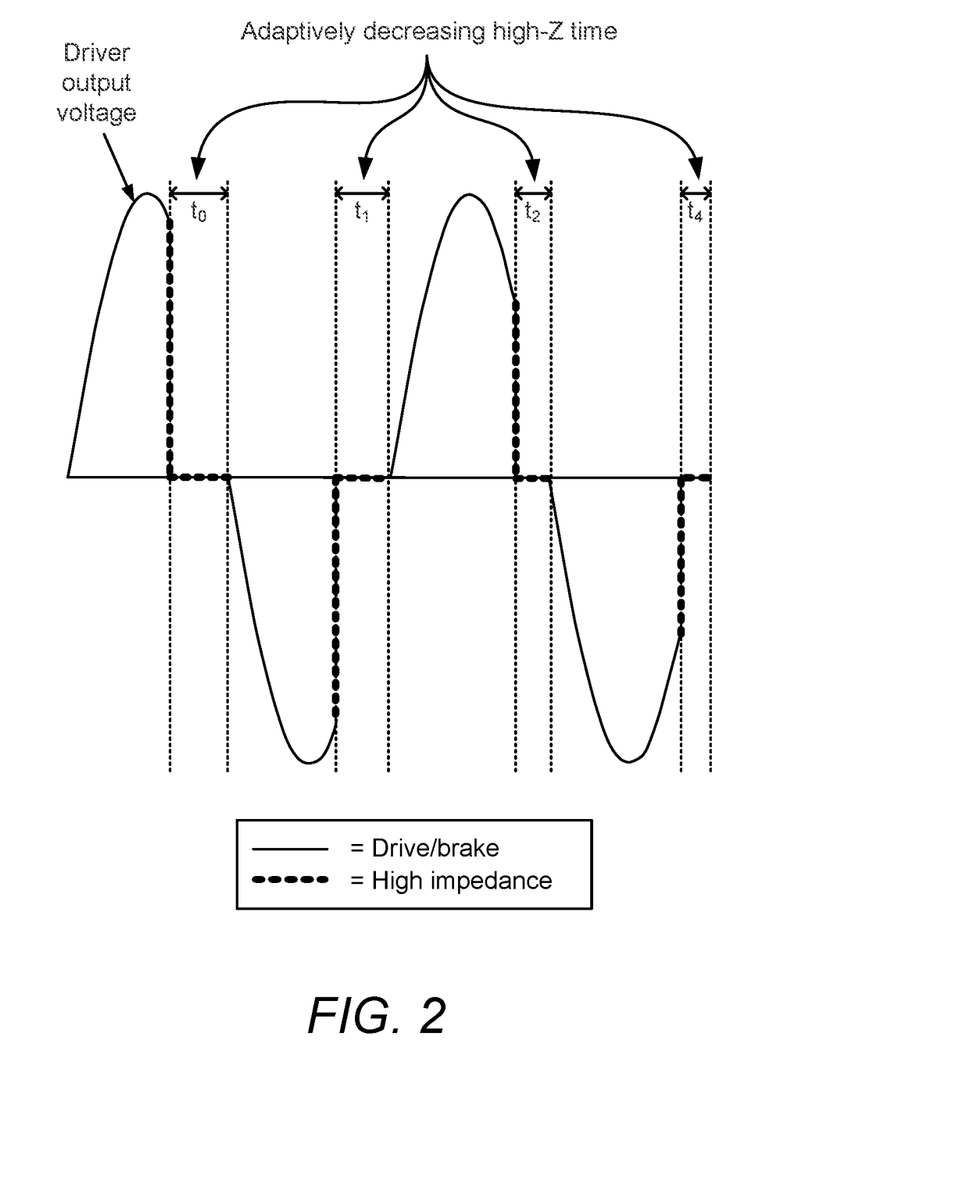
FIG. 2 is a graph of the output voltage of an LRA control signal according to aspects.

FIG. 2 is a graph of the output voltage of an LRA control signal according to aspects of the disclosure. In FIG. 2, the high-Z time decreased for each half cycle, e.g., $t_0 > t_1 > t_2 > t_4$, which results in the drive duty cycle being correspondingly increased. This maximizes the power that can be applied to the LRA during both the drive and brake operations, which results in the LRA being able to quickly come to full vibration amplitude and quickly return to a rest state. This capability makes it possible for an LRA to provide the crisp response needed to simulate a button push on a device that has no mechanical buttons, for example.

Figure 3:
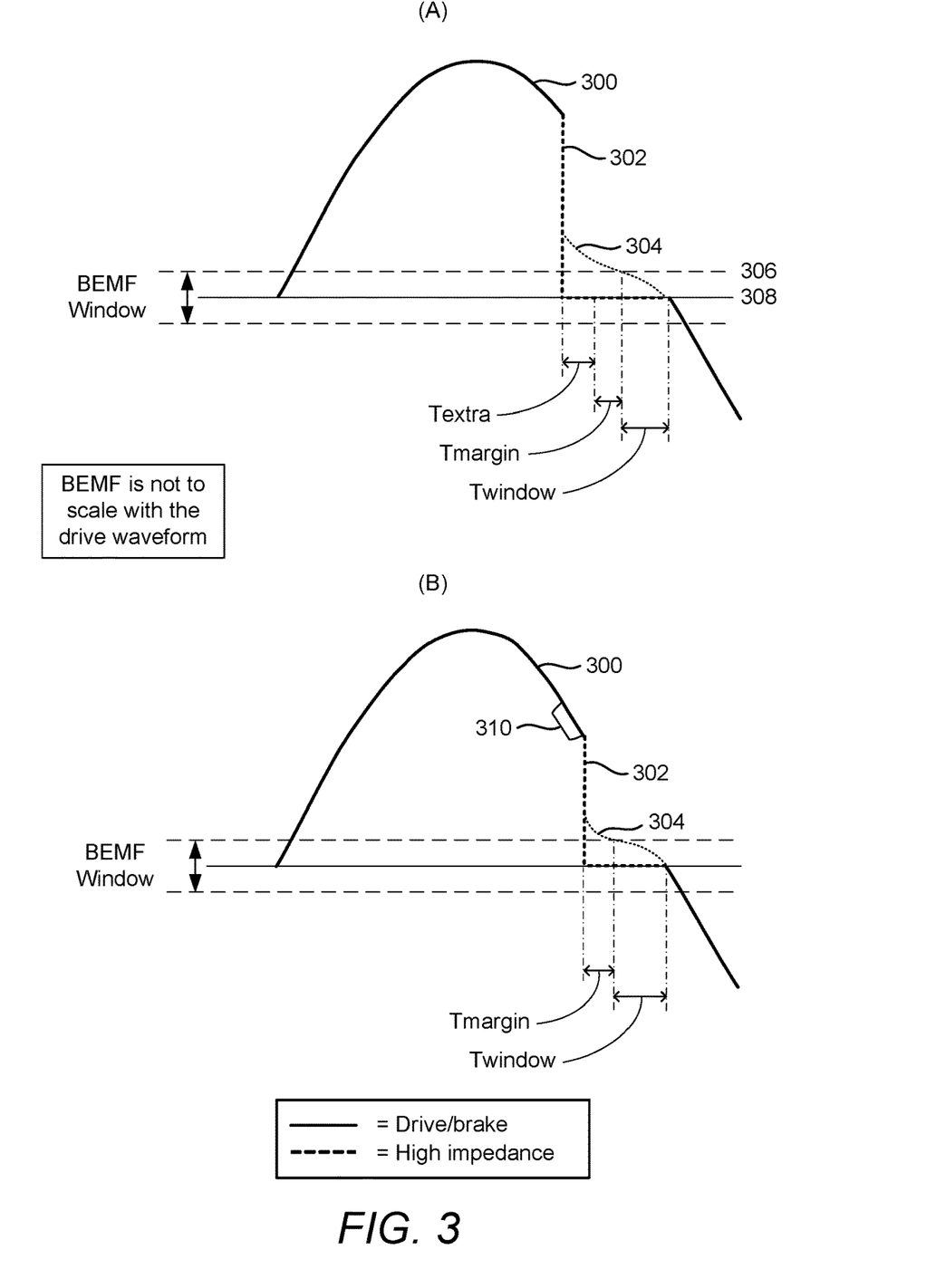
FIG. 3 shows in more detail portions of an LRA control signal according to some aspects.

FIG. 3 shows portions of an LRA control signal according to aspects of the disclosure in more detail. FIG. 3(a) shows a half cycle of the control signal—which, in this example, is a sine wave—before adjustment of the duty cycle according to aspects of the disclosure. The control signal waveform includes an active portion 300 and a high-Z portion 302. During the high-Z portion 302 of the waveform, the BEMF voltage 304 may be detected. Note that, in FIG. 3 and the following figures, the BEMF voltage 304 is not to scale with the drive waveform.

The time from when the BEMF voltage 304 crosses a first voltage threshold 306 until the BEMF voltage 304 changes polarity, i.e., crosses the zero voltage threshold 308, is shown in FIG. 3 as time Twindow. Twindow is the time during which the LRA driver must be in high-Z mode in order to detect the zero crossing and determine the current resonant frequency of the LRA. Tmargin is the time required for the voltage driver to go from an active state to a high-Z state, and may include additional time to accommodate possible variations in Twindow, e.g., due to changes in operating temperature of the LRA, etc. Textra is the additional time during which the voltage driver is in a high-Z state unnecessarily. Twindow can vary according to the operating conditions of the LRA, but the time for a driver to go from active to high-Z state is relatively stable. Thus, in some aspects, Tmargin is treated as a constant value. In some aspects, the value of Tmargin may be programmed.

FIG. 3(b) shows a half cycle of the control signal after adjustment of the duty cycle according to aspects of the disclosure. In FIG. 3, the control signal duty cycle is adjusted to eliminate Textra, which provides an additional drive time 310. In this manner, the maximum power can be provided to the LRA to drive and brake the vibrations.

In some aspects, the amount by which the control signal duty cycle can be changed at each adjustment is limited. In some aspects, a parameter DRV_DUTY_STEP defines the maximum amount by which the control signal duty cycle can be adjusted per half cycle or other time duration.

In some aspects, having a wide high-Z portion 302 in the initial cycles is valuable to find and track the resonant frequency. As the energy in the LRA increases, however, e.g., during a drive pattern, the BEMF amplitude increases and the required high-Z time decreases. As the duty cycle is increased, the LRA accelerates faster. In some aspects, the duty cycle is dynamically adjusted by calculating a needed high-Z time for a half cycle as equal to the Twindow time measured for the previous half cycle plus a fixed Tmargin time.

In FIG. 3, the concept is described as eliminating Textra. Likewise, the same concept could be described as dividing the time between the start of the high-Z portion and the zero crossing into two portions, Tmargin and Twindow, and changing the duty cycle until Tmargin reaches a minimum allowed value, as shown in FIG. 4.

Figure 4:
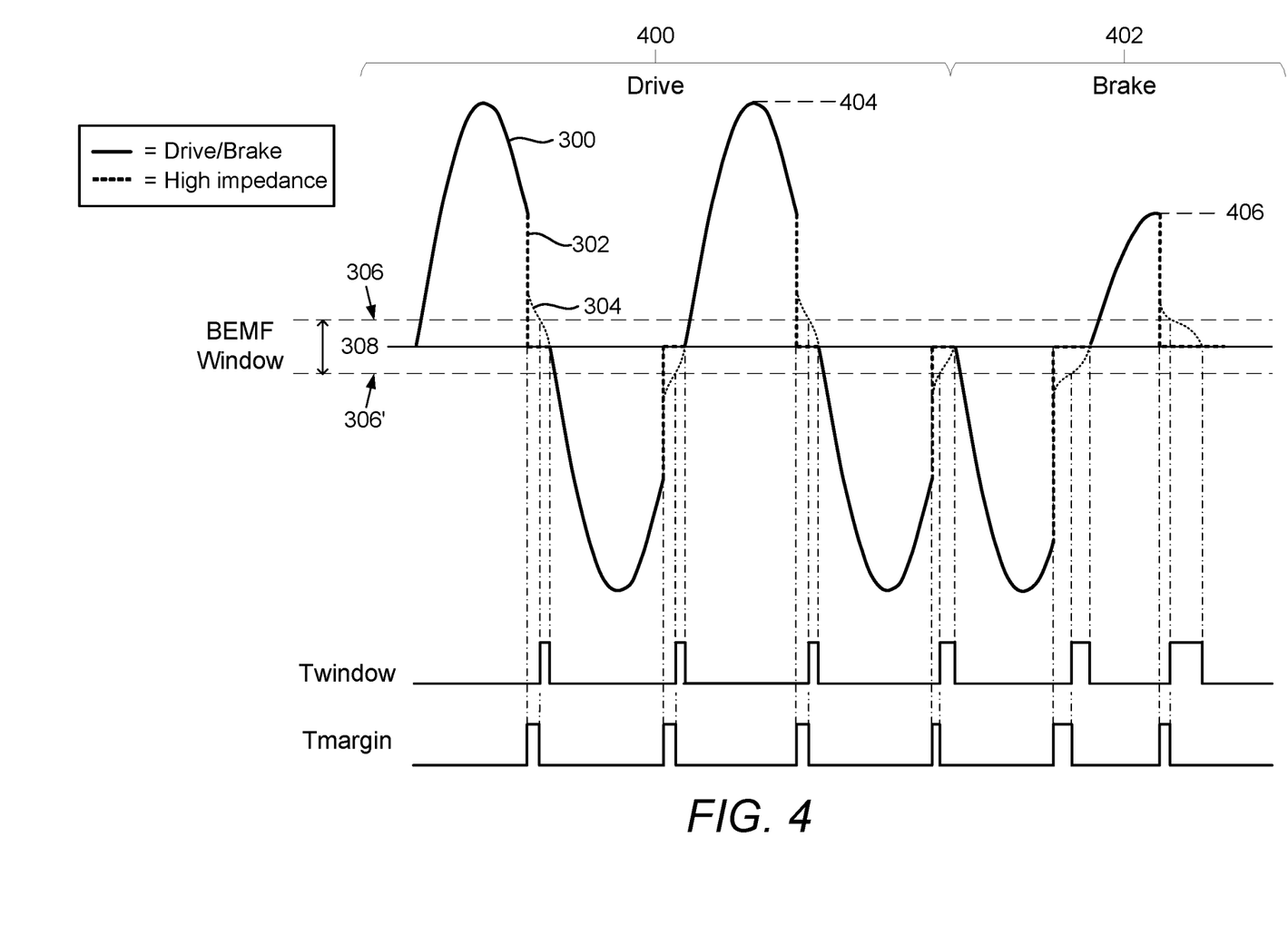
FIG. 4 is an example LRA control signal with a duty cycle that is dynamically adjusted according to some aspects.

FIG. 4 is an example LRA control signal with a duty cycle that is dynamically adjusted according to some aspects. FIG. 4 shows the control signal waveform during both a drive operation 400 and a brake operation 402. During the drive operation 400, the control signal is considered a drive signal or driving signal, and during the brake operation 402, the control signal is considered a brake signal or braking signal. The control signal will drive the LRA to start its vibration, then brake the LRA to stop its vibration, after which the LRA control signal stops being generated. In some aspects, the drive signal will have a first polarity and the brake signal will have a second polarity. Typically the brake signal will have the opposite polarity of the drive signal, e.g., the brake signal will be 180 degrees out of phase with the drive signal.

During the drive operation 400, the control signal voltage is a maximum amplitude 404 and the duty cycle is adjusted such that the duration of the high-Z portion 302 of the half cycle is equal to Twindow plus a target (e.g., minimum) value of Tmargin. This maximizes the duration of the active portion 300 and thus maximizes the driving power of the control signal. During the drive operation 400, one goal is to increase the BEMF amplitude and thus reduce Twindow.

During the brake operation 402, the control signal will change polarity and thus brake the vibrations of the LRA. During the brake operation 402, the goal is to reduce BEMF and thus increase Twindow, but braking amplitude should continually be adjusted to get a specific target BEMF reduction factor each half cycle, getting smaller and smaller as the BEMF approaches zero. This is shown in FIG. 4, where the control signal is reduced to a lower amplitude 406 in order to achieve a specific attenuation of the BEMF and an increase in the Twindow by a specific factor compared to the previous Twindow. If braking is very aggressive without a reduction in amplitude, the vibration strength may actually start to increase again due to what is referred to as overbraking.

In some aspects, the equation for the brake amplitude is:

$$B[n] = \frac{B_{cal} * (R_{set} - R_{nat}) * Twindow_{cal}[0]}{(R_{cal} - R_{nat}) * Twindow[n-1]}$$

where
  Bcal is the brake amplitude used during the forced response part of a calibration sequence;
  $Twindow_{nat}$ is the Twindow[n] measured during the natural response part of a calibration sequence;
  $Twindow_{cal}$ is the Twindow[n] measured during the forced response part of a calibration sequence
  Rnat is the natural BEMF reduction factor calculated during calibration:

$$R_{nat} = 16 * \left(1 - \frac{Twindow_{nat}[0]}{Twindow_{nat}[1]}\right)$$

Rcal is the forced BEMF reduction factor calculated during calibration:

$$R_{cal} = 16 * \left(1 - \frac{Twindow_{cal}[0]}{Twindow_{cal}[1]}\right)$$

Rset is the desired BEMF reduction factor:

$$R_{set} = 16 * \left(1 - \frac{Twindow[n-1]}{Twindow[n]}\right)$$

In some aspects, the reduction factor Rset is programmable.

In some aspects, the high-Z time (Thiz) of the braking half-cycle may be calculated as:

$$Thiz[n] = Twindow[n] + Tmargin$$

where $$Twindow[n] = \frac{Twindow[n-1]}{\left(1 - \frac{Rset}{16}\right)}$$

Figure 5:
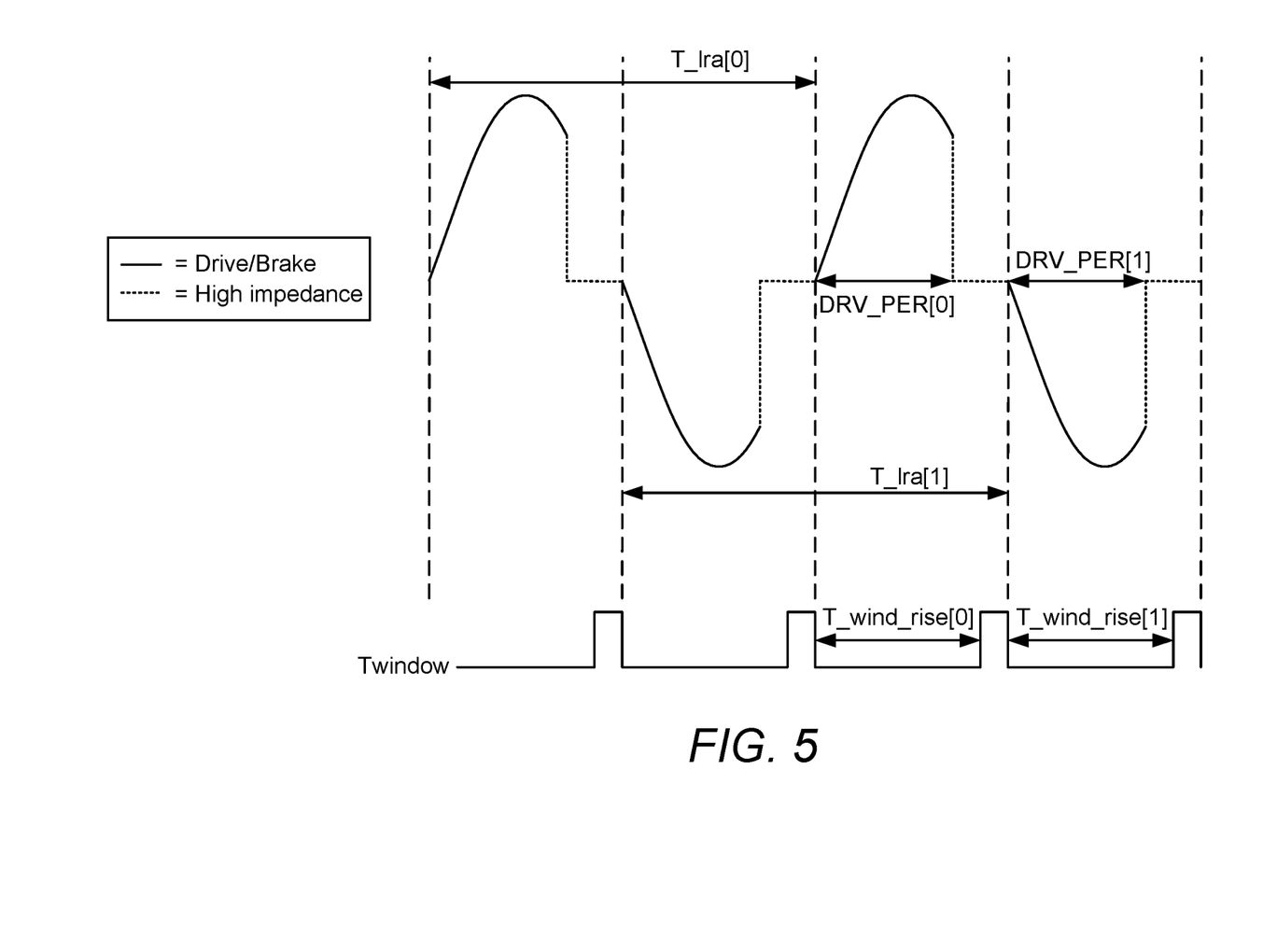
FIG. 5 illustrates some of the measurements that are included in a method of dynamically calculating the drive duty cycle of an LRA control signal according to some aspects.

FIG. 5 illustrates some of the measurements that are included in a method of calculating drive duty cycle according to some aspects. As seen in FIG. 5, T_lra is the period of the natural resonance of the LRA, and DRV_PER is the length of time that the driver is in active mode. As in FIG. 4, Twindow is time that it takes for the BEMF voltage to go from a measurement threshold voltage to the zero voltage crossing, and is the time during which the LRA driver must be in high-Z mode in order to detect the zero crossing and determine the current resonant frequency of the LRA. In FIG. 5, the duration of time from the end of one Twindow period to the beginning of the next Twindow period is T_wind_rise.

In some aspects, the initial drive period (e.g., the drive period initially used at the start of a drive operation) is calculated as a fixed percentage of half of the natural resonance period last measured:

$$DRV\_PER_n = \frac{DRIVE\_DUTY}{100} \times \frac{T\_lra_{n-1}}{2}$$

where DRIVE_DUTY is a default or saved parameter. This equation is used when Twindow is not yet measured and thus T_wind_rise is not yet known.

Once T_lra and Twindow are measured and T_wind_rise is calculated, the target drive period ADPT_DRV_PER can be calculated as T_wind_rise reduced by Tmargin. In some aspects, Tmargin is defined as a specified percentage of half of the current resonant period of the LRA:

$$ADPT\_DRV\_PER_n = T\_wind\_rise_{n-1} - \frac{TWIND\_MARGIN}{100} \times \frac{T\_lra_{n-1}}{2}$$

where TWIND_MARGIN/100 is the specified percentage. In some aspects, a different TWIND_MARGIN may be defined for the drive and brake operations, e.g., there may be separate parameters DRV_TWIND_MARGIN and BRK_TWIND_MARGIN, which can be independently configured.

In some aspects, a limit is applied to how quickly a current drive period DRV_PER can be changed to the target drive period ADPT_DRV_PER during a drive operation. For example, in some aspects, DRV_PER is allowed to change by no more than a maximum of some percentage of a half cycle:

$$DRV\_PER_n = DRV\_PER_{n-1} + \frac{DRIVE\_DUTY\_STEP}{100} \times T\_lra_{n-1}$$

where DRIVE_DUTY_STEP/100 defines the maximum percentage change allowed at each calculation. In some aspects, there may also be a separate BRAKE_DUTY_STEP for defining the maximum percentage change allowed at each calculation during a brake operation.

The table below illustrates possible values for the parameters DRV_DUTY_STEP, DRV_TWIND_MARGIN, and BRK_TWIN_MARGIN according to some aspects.

TABLE 1

| Bits | Name | Description |
| --- | --- | --- |
| 7:6 | DRV_DUTY_STEP | Adaptive drive step increment size when adaptive drive duty is enabled<br>0: 1.5625% every half cycle<br>1: 3.125% every half cycle<br>2: 6.25% every half cycle<br>3: 1.25% every half cycle |
| 5:3 | DRV_TWIND_MARGIN | Window time margin for closed loop driving<br>0: 3.13%<br>1: 6.25%<br>2: 9.38%<br>3: 12.50%<br>4: 15.63%<br>5: 18.75%<br>6: 21.88%<br>7: 25.00% |
| 2:0 | BRK_TWIND_MARGIN | Window time margin for closed loop braking<br>0: 6.25%<br>1: 12.50%<br>2: 18.75%<br>3: 25.00%<br>4: 31.25%<br>5: 37.50%<br>6: 43.75%<br>7: 50.00% |

Figure 6:
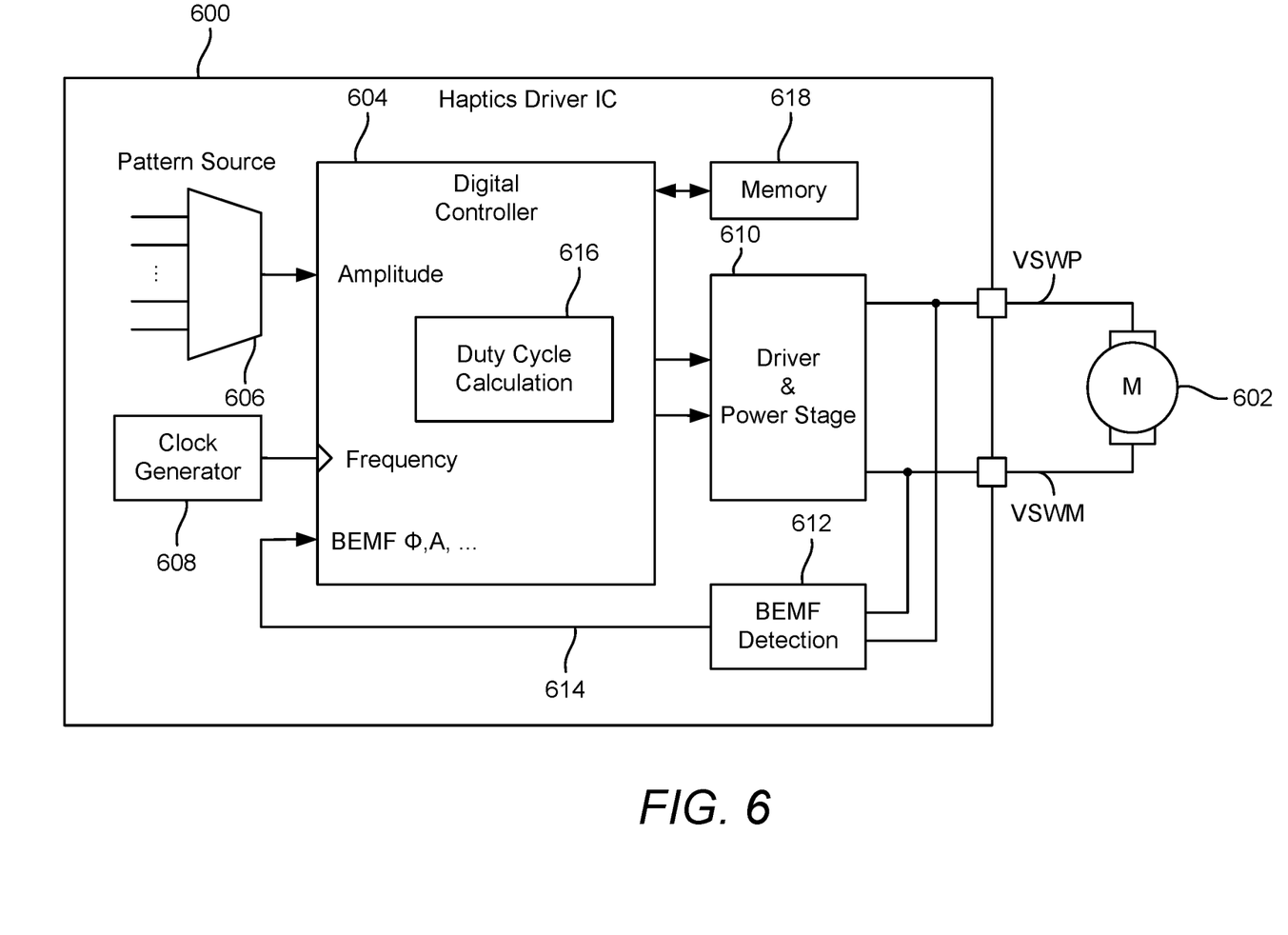
FIG. 6 is a block diagram illustrating an exemplary apparatus for dynamically adapting a drive duty cycle of an LRA control signal according to some aspects.

FIG. 6 is a block diagram illustrating an exemplary apparatus 600 for dynamically adapting the drive duty cycle of an LRA 602 according to some aspects. In FIG. 6, apparatus 600, which may comprise a haptics driver circuit, includes a digital controller 604 or other processor circuitry. In some aspects, the digital controller 604 receives amplitude information from a pattern source 606 and frequency information from a clock generator 608, and outputs signals that control a driver and power stage 610, which produces a pair of control signals (VSWP and VSWM) that drive the LRA 602. Apparatus 600 includes a BEMF detection circuit 612, which produces information 614 about the phase (φ) and amplitude (A) of the BEMF detected across the inputs to the LRA 602, other information, or combinations thereof. This information 614 is used by the digital controller 604 to dynamically adjust the amplitude, period, and duty cycle of the LRA control signals VSWP and VSWM according to the techniques described herein. In some aspects, a duty cycle calculation 616 function, module, or circuit may perform any of the calculations described herein. For example, BEMF information can be used to determine values for Twindow, T_lra, and T_wind_rise described above. In some aspects, apparatus 600 may include a memory 618 communicatively coupled to the digital controller 604, for storing computer instructions, parameters, variables, etc. The specific components and connections shown in FIG. 6 are illustrative and not limiting.

The methods and systems described herein provide a number of technical solutions to the technical problems associated with conventional methods and systems for controlling an LRA. For example, dynamically adjusting the duty cycle of the active portion of the control signal according to aspects disclosed herein allow for an increased drive cycle—increases of up to 100% compared to conventional QWD and up to 33% compared to conventional ⅜ drive—which provides faster acceleration and higher G-force to be applied to the LRA compared to conventional methods for the same drive pattern. Moreover, by reducing the chance of missing the BEMF zero-crossing event, the techniques described herein avoid the auto-resonance errors during drive and brake operations commonly suffered by conventional methods.

Figure 7:
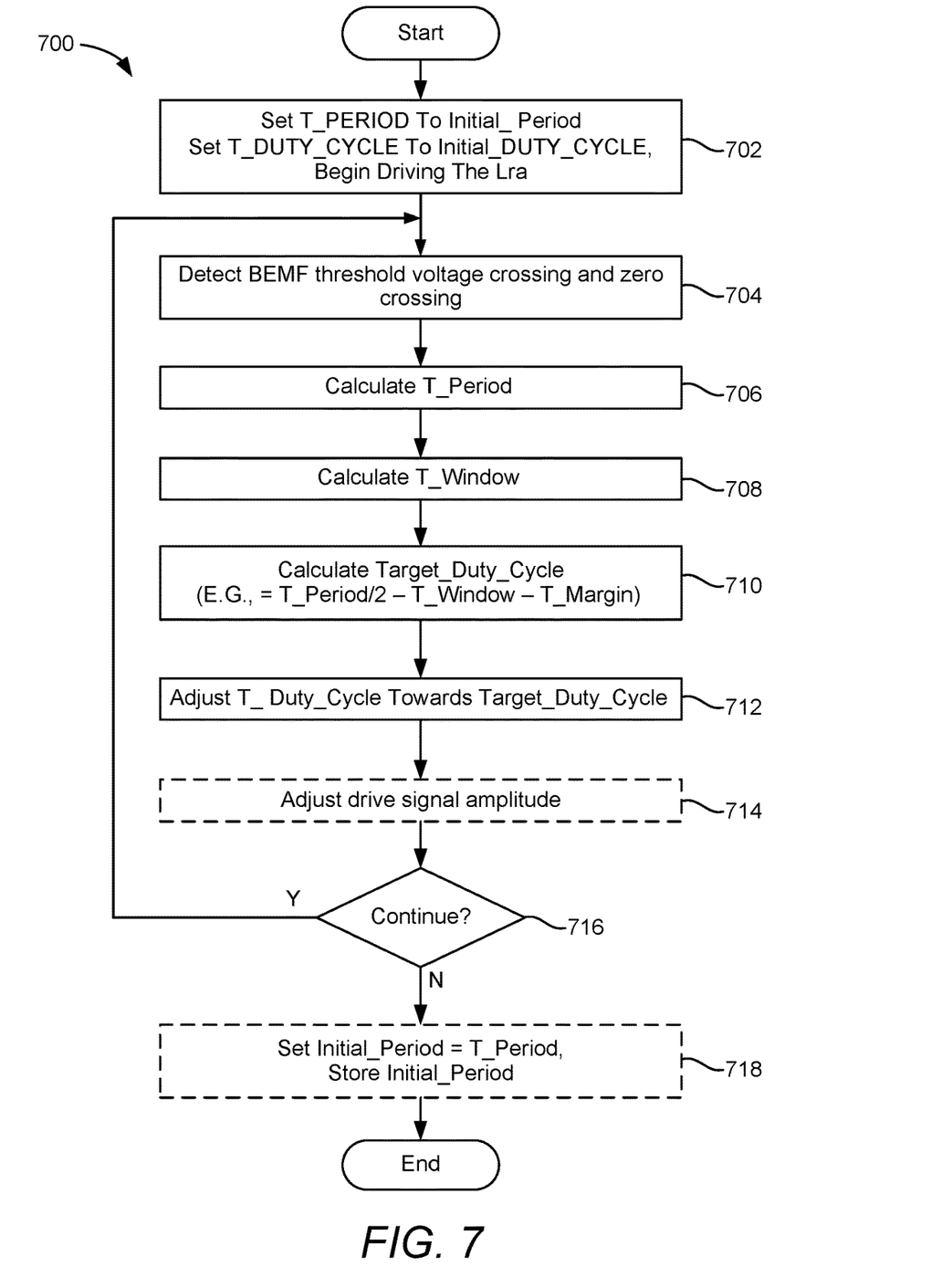
FIG. 7 illustrates an exemplary method of dynamically adapting a drive duty cycle of an LRA control signal according to some aspects.

FIG. 7 illustrates an exemplary method 700 of operating an LRA according to some aspects of the disclosure. In FIG. 7, the following variables are used:

T_PERIOD is the presumptive period of the resonant frequency of the LRA;

T_DUTY_CYCLE is the portion of T_PERIOD during which the driver is active (the remaining portion of that period the driver being in a high-Z state);

T_WINDOW is the measured amount of time the BEMF takes to go from a threshold voltage to a zero crossing;

T_MARGIN is the time that the driver circuit takes to go from an active state to a high-Z state, and may also include additional time to accommodate variances due to operating conditions, etc.;

TARGET_DUTY_CYCLE is the calculated ideal T_DUTY_CYCLE;

INITIAL_PERIOD is an initial value for T_PERIOD

INITIAL_DUTY_CYCLE is an initial value for T_DUTY_CYCLE, e.g., to be used before T_WINDOW has been measured.

In FIG. 7, the method 700 starts with the activation of LRA control signals, e.g., the initiation of a drive operation, and setting some parameters to initial values. At 702, T_PERIOD is set to an initial period (INITIAL_PERIOD), T_DUTY_CYCLE is set to an initial duty cycle (INITIAL_DUTY_CYCLE), and the LRA is driven, e.g., the driver begins outputting the control signals into the LRA input terminals. In some aspects, T_DUTY_CYCLE is set to a conservative value, e.g., one that provides a long high-Z state so that the BEMF zero crossing will not be accidently missed.

At 704, the BEMF threshold voltage crossing and zero crossing is detected.

At 706, T_PERIOD is calculated, e.g., based on the BEMF zero crossing time. In some aspects, the calculated T_PERIOD may be slightly different from the initial T_PERIOD, e.g., due to aging of the LRA, changes in temperature or other operating conditions, etc., in which case the calculated T_PERIOD replaces the previously used value.

At 708, T_WINDOW is calculated, e.g., based on the BEMF threshold voltage crossing time and the BEMF zero voltage crossing time. In some aspects:

$$T\_WINDOW = (BEMF\ zero\ crossing\ time) - (BEMF\ threshold\ voltage\ crossing\ time)$$

At 710, the calculated values of T_PERIOD and T_WINDOW are used to calculate the TARGET_DUTY_CYCLE. In some aspects, the TARGET_DUTY_CYCLE is calculated as percentage:

$$(T\_PERIOD/2 - T\_WINDOW - T\_MARGIN)/(T\_PERIOD/2)$$

or as a duration of time:

$$(T\_PERIOD/2 - T\_WINDOW - T\_MARGIN)$$

where T_MARGIN may be a fixed value, a programmable value, or a dynamically calculated value.

At 712, T_DUTY_CYCLE is adjusted towards TARGET_DUTY_CYCLE. In some aspects, T_DUTY_CYCLE can be set to TARGET_DUTY_CYCLE. In other aspects, however, the amount that T_DUTY_CYCLE can change at any adjustment may be limited by a maximum step size (STEP_SIZE), which may be defined as a duration of time or as a percentage of T_PERIOD. In these aspects, the following equations may be used:

$$DELTA\_DUTY\_CYCLE = T\_DUTY\_CYCLE - TARGET\_DUTY\_CYCLE$$

$$T\_DUTY\_CYCLE = T\_DUTY\_CYCLE - MAX(DELTA\_DUTY\_CYCLE, STEP\_SIZE)$$

where STEP_SIZE is a duration of time.

At 714, the drive signal amplitude may be optionally adjusted, e.g., during braking.

During driving, the control signal amplitude is generally set to a maximum value, but in some aspects, there may be a ramp-up of the control signal amplitude or other type of amplitude modulation as needed.

At 716, if the drive or brake operation is ongoing, the process repeats starting at 704. This continues until the drive or brake operation ends. If the drive or brake operation has completed, the process goes to 718.

At 718, the current value of T_PERIOD may optionally be stored as the new INITIAL_PERIOD, e.g., under the presumption that the most recently calculated T_PERIOD will continue to reflect the natural resonance of the LRA in the future.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application-specific integrated circuit (ASIC), a field-programmable gate array (FPGA), or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., a user equipment (UE)). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of dynamically adapting a drive duty cycle of a linear resonant actuator (LRA) control signal, the method comprising:
   generating an LRA control signal having a period, the period having an active portion and a high-Z portion according to a duty cycle;
   detecting, during the high-Z portion of the period, a back electromotive force (BEMF) threshold voltage crossing time and a BEMF zero voltage crossing time;
   the period;
   calculating a BEMF measurement window;
   calculating a target duty cycle; and
   adjusting the duty cycle of the LRA control signal towards the target duty cycle.

2. The method of claim 1, further comprising adjusting a signal amplitude of the LRA control signal.

3. The method of claim 1, further comprising repeating the method while the LRA control signal continues to be generated.

4. The method of claim 1, further comprising, prior to generating the LRA control signal, setting the period to an initial period and setting the duty cycle to an initial duty cycle.

5. The method of claim 4, further comprising, after generating the LRA control signal, storing a current value of the period as the initial period.

6. The method of claim 1, wherein calculating the period comprises calculating the period based on the BEMF zero voltage crossing time.

7. The method of claim 6, wherein the period=2×((BEMF zero voltage crossing time of a half cycle)−(beginning time of active portion of the half cycle)).

8. The method of claim 1, wherein calculating the BEMF measurement window comprises calculating the BEMF measurement window based on the BEMF threshold voltage crossing time and the BEMF zero voltage crossing time.

9. The method of claim 1, wherein calculating the target duty cycle comprises calculating the target duty cycle as a function of the period, the BEMF measurement window, and a margin time.

10. The method of claim 9, wherein the target duty cycle=(period/2−BEMF measurement window−margin time).

11. The method of claim 9, wherein the target duty cycle=(period/2−BEMF measurement window−margin time)/(period/2).

12. The method of claim 1, wherein adjusting the duty cycle towards the target duty cycle comprises setting the duty cycle equal to the target duty cycle.

13. The method of claim 1, wherein adjusting the duty cycle towards the target duty cycle comprises adjusting the duty cycle towards the target duty cycle by no more than a maximum step size.

14. The method of claim 1, wherein, when the LRA control signal is a drive signal, the LRA control signal has a first polarity, and when the LRA control signal is a brake signal, the LRA control signal has a second polarity different from the first polarity.

15. The method of claim 14 wherein the second polarity is the opposite polarity of the first polarity.

16. An apparatus for dynamically adapting a drive duty cycle of a linear resonant actuator (LRA) control signal, the apparatus comprising:
    a memory; and
    at least one processor communicatively coupled to the memory, the at least one processor configured to:
       generate an LRA control signal having a period, the period having an active portion and a high-Z portion according to a duty cycle;
       detect, during the high-Z portion of the period, a back electromotive force (BEMF) threshold voltage crossing time and a BEMF zero voltage crossing time;
       the period;
       calculate a BEMF measurement window;
       calculate a target duty cycle; and
       adjust the duty cycle of the LRA control signal towards the target duty cycle.

17. The apparatus of claim 16, wherein the at least one processor is further configured to adjust an amplitude of the LRA control signal.

18. The apparatus of claim 16, wherein the at least one processor is further configured to repeat the generate, detect, calculate, and adjust operations while the LRA control signal continues to be generated.

19. The apparatus of claim 16, wherein the at least one processor is further configured to, prior to generating the LRA control signal, set the period to an initial period and set the duty cycle to an initial duty cycle.

20. The apparatus of claim 19, wherein the at least one processor is further configured to, after generating the LRA control signal, store a current value of the period as the initial period.

21. The apparatus of claim 16, wherein calculating the period comprises calculating the period based on the BEMF zero voltage crossing time.

22. The apparatus of claim 21, wherein the period=2× ((BEMF zero voltage crossing time of a half cycle)−(beginning time of active portion of the half cycle)).

23. The apparatus of claim 16, wherein calculating the BEMF measurement window comprises calculating the BEMF measurement window based on the BEMF threshold voltage crossing time and the BEMF zero voltage crossing time.

24. The apparatus of claim 16, wherein calculating the target duty cycle comprises calculating the target duty cycle as a function of the period, the BEMF measurement window, and a margin time.

25. The apparatus of claim 24, wherein the target duty cycle=(period/2−BEMF measurement window−margin time).

26. The apparatus of claim 24, wherein the target duty cycle=(period/2−BEMF measurement window−margin time)/(period/2).

27. The apparatus of claim 16, wherein adjusting the duty cycle towards the target duty cycle comprises setting the duty cycle equal to the target duty cycle.

28. The apparatus of claim 16, wherein adjusting the duty cycle towards the target duty cycle comprises adjusting the duty cycle towards the target duty cycle by no more than a maximum step size.

29. The apparatus of claim 16, wherein, when the LRA control signal is a drive signal, the LRA control signal has a first polarity, and when the LRA control signal is a brake signal, the LRA control signal has a second polarity different from the first polarity.

30. The apparatus of claim 29 wherein the second polarity is the opposite polarity of the first polarity.

31. An apparatus for operating a linear resonant actuator (LRA), the apparatus comprising:
means for generating an LRA control signal having a period, the period having an active portion and a high-Z portion according to a duty cycle;
means for detecting, during the high-Z portion of the period, a back electromotive force (BEMF) threshold voltage crossing time and zero voltage crossing time;
means for the period;
means for calculating a BEMF measurement window;
means for calculating a target duty cycle; and
means for adjusting the duty cycle towards the target duty cycle.

32. A non-transitory computer-readable medium storing computer-executable instructions, the computer-executable instructions comprising:
at least one instruction instructing an apparatus to generate an LRA control signal having a period, the period having an active portion and a high-Z portion according to a duty cycle;
at least one instruction instructing the apparatus to detect, during the high-Z portion of the period, a back electromotive force (BEMF) threshold voltage crossing time and zero voltage crossing time;
at least one instruction instructing the apparatus to the period;
at least one instruction instructing the apparatus to calculate a BEMF measurement window;
at least one instruction instructing the apparatus to calculate a target duty cycle; and
at least one instruction instructing the apparatus to adjust the duty cycle towards the target duty cycle.

* * * * *